US012798390B2

(12) United States Patent
Achterberg et al.

(10) Patent No.: US 12,798,390 B2
(45) Date of Patent: Nov. 17, 2026

(54) LINEAR TRANSPORT SYSTEM AND MOVABLE UNIT OF A LINEAR TRANSPORT SYSTEM

(71) Applicant: Beckhoff Automation GmbH, Verl (DE)

(72) Inventors: Jan Achterberg, Duisburg (DE); Manuel Bettenworth, Vienna (AT); Uwe Prüssmeier, Lemgo (DE); Andreas Sinzenich, Steinhagen (DE)

(73) Assignee: Beckhoff Automation GmbH, Verl (DE)

( * ) Notice: Subject to any disclaimer, the term of this patent is extended or adjusted under 35 U.S.C. 154(b) by 798 days.

(21) Appl. No.: 18/304,098

(22) Filed: Apr. 20, 2023

(65) Prior Publication Data

US 2023/0256832 A1 Aug. 17, 2023

Related U.S. Application Data

(63) Continuation of application No. PCT/EP2021/078901, filed on Oct. 19, 2021.

(30) Foreign Application Priority Data

Oct. 22, 2020 (DE) ..................... 10 2020 127 822.5

(51) Int. Cl.
*B60L 13/03* (2006.01)
*B60L 7/24* (2006.01)

(52) U.S. Cl.
CPC ................. *B60L 13/03* (2013.01); *B60L 7/24* (2013.01)

(58) Field of Classification Search
CPC .......... B60L 13/03; B60L 7/24; F16D 63/008; Y02T 10/70; Y02T 10/7072; Y02T 90/14
See application file for complete search history.

(56) References Cited

U.S. PATENT DOCUMENTS 5,473,992 A * 12/1995 Takei .................. H02K 7/1023 188/36
5,927,657 A * 7/1999 Takasan .................. H04B 3/56 104/297

(Continued)

FOREIGN PATENT DOCUMENTS

AU 2008323024 B2 * 6/2015 ............... B66D 5/14
CN 106429712 A * 2/2017 ............... B66B 5/26

(Continued)

OTHER PUBLICATIONS

International Preliminary Report on Patentability dated Jan. 25, 2023 in connection with International Patent Application No. PCT/EP2021/078901, 36 pages including English translation.

(Continued)

*Primary Examiner* — Jason C Smith
(74) *Attorney, Agent, or Firm* — Dorsey & Whitney LLP

(57) ABSTRACT

A linear transport system comprises a stationary unit and a movable unit. The linear transport system also comprises a drive for driving the movable unit, the drive comprising a linear motor, the linear motor comprising a stator and a rotor. The stator comprises the one or the plurality of stationary units, and the rotor is arranged on the movable unit and comprises one or a plurality of magnets. The stationary unit comprises an energy sending coil. The movable unit comprises an energy receiving coil. The movable unit comprises a fixing device, where the fixing device is set up to fix the movable unit in the linear transport system. The fixing device comprises a movable element, where the movable element can be moved between a first position and a second position, where in the first position the movable element initiates a mechanical fixing of the movable unit.

12 Claims, 13 Drawing Sheets

(56) References Cited

U.S. PATENT DOCUMENTS

| | | | | |
|---|---|---|---|---|
| 7,770,700 | B2 * | 8/2010 | Yajima | H02K 41/03 188/267 |
| 10,483,895 | B2 * | 11/2019 | Sun | B60L 15/007 |
| 11,055,703 | B2 * | 7/2021 | Kondo | H04L 63/123 |
| 11,597,633 | B2 * | 3/2023 | Lappalainen | B66B 1/32 |
| 12,040,634 | B2 | 7/2024 | Pruessmeier et al. | |
| 12,240,425 | B2 * | 3/2025 | Witte | B60T 1/067 |
| 2007/0039788 | A1 * | 2/2007 | Fulton | B60L 7/28 188/164 |
| 2009/0228777 | A1 * | 9/2009 | Henry | G06F 16/40 707/999.005 |
| 2016/0328890 | A1 * | 11/2016 | Keane | G07C 5/008 |
| 2018/0374091 | A1 * | 12/2018 | Madisetti | G06Q 20/3825 |
| 2020/0184739 | A1 * | 6/2020 | Nathan | G06Q 10/20 |
| 2021/0046826 | A1 * | 2/2021 | Prüssmeier | H02J 50/40 |
| 2023/0256832 | A1 * | 8/2023 | Achterberg | B60L 7/24 105/49 |
| 2024/0372452 | A1 * | 11/2024 | Nguyen | F16D 63/002 |

FOREIGN PATENT DOCUMENTS

| | | | | | |
|---|---|---|---|---|---|
| CN | 114154951 | A | * | 3/2022 | G06Q 10/20 |
| DE | 102018111715 | A1 | | 11/2019 | |
| FR | 3102020 | A1 | * | 4/2021 | B60L 7/22 |
| JP | S62141957 | A | | 6/1987 | |
| JP | 09224366 | A | * | 8/1997 | |
| JP | H09224366 | A | | 8/1997 | |
| JP | 2022535289 | A | * | 8/2022 | B60T 13/745 |
| JP | 7754760 | B2 | * | 10/2025 | B25J 9/0048 |
| KR | 20250179435 | A | * | 12/2025 | H02N 2/186 |
| WO | 9632595 | A1 | | 10/1996 | |
| WO | 2019219834 | A1 | | 11/2019 | |

OTHER PUBLICATIONS

International Search Report and Written Opinion dated Mar. 16, 2022 in connection with International Patent Application No. PCT/EP2021/078901, 34 pages including English translation.

Office Action dated Jun. 22, 2021 in connection with German patent application No. 10 2020 127 822.5, 11 pages Including English translation.

* cited by examiner

LINEAR TRANSPORT SYSTEM AND MOVABLE UNIT OF A LINEAR TRANSPORT SYSTEM

CROSS-REFERENCE TO RELATED APPLICATIONS

This patent application is a continuation of International Application PCT/JP2021/078901, filed Oct. 19, 2021, entitled LINEAR TRANSPORT SYSTEM AND MOVABLE UNIT OF A LINEAR TRANSPORT SYSTEM, which claims the priority of German patent application DE 10 2020 127 822.5, filed Oct. 22, 2020, entitled LINEARES TRANSPORTSYSTEM UND BEWEGLICHE EINHEIT EINES LINEAREN TRANSPORTSYSTEMS, each of which is incorporated by reference herein, in the entirety and for all purposes.

FIELD

The invention relates to a linear transport system and to a movable unit of a linear transport system.

BACKGROUND

Linear transport systems are known from the prior art in which movable units driven by a linear motor may move along a guide rail. Patent application DE 10 2018 111 715 A1, for example, discloses a linear transport system having such components. The said patent application further discloses a system for transferring energy and data from stationary units of the linear transport system to movable units of the linear transport system. Such linear transport systems may be used in automation technology, e.g. for transporting products. Depending on the type of products to be transported by a linear transport system, positioning of the movable units solely with the aid of the linear motor may not be sufficient. In particular, it may be necessary to avoid uncontrolled movements and to slow down movable units.

SUMMARY

The present invention provides a linear transport system in which the movable units may be fixed within the linear transport system. The present invention also provides a movable unit of a linear transport system having such an option for fixing objects.

According to a first aspect, a linear transport system comprises at least a stationary unit and at least a movable unit. A plurality of stationary units and/or a plurality of movable units may be provided. The linear transport system comprises a drive for driving the movable unit, said drive comprising a linear motor. The linear motor comprises a stator and a rotor, wherein the stator comprises the one or the plurality of stationary units and the rotor is arranged on the movable unit and comprises one or a plurality of magnets. It may be provided in this context that each movable unit comprises a rotor of the linear motor. The stationary unit comprises an energy transmitting coil via which energy may be transmitted to an energy receiving coil of the movable unit. The movable unit comprises a fixing device set up to fix the movable unit in the linear transport system. The fixing device comprises a movable element that may be moved between a first position and a second position. When the movable element is arranged in the first position, the movable element thereby triggers a mechanical fixation of the movable unit.

It may be provided that an energy for moving the movable element is transmitted from the stationary unit to the movable unit with the aid of the energy transmitting coil and the energy receiving coil. With the aid of the fixing element, the movable unit may be fixed within the linear transport system, wherein the term fixing includes both creating complete immobility of the movable unit and preventing movement of the movable unit.

The fixing device may thus be set up to completely suppress or also to slow down a movement of the movable unit. It may be provided in this context that in particular a movement in a driving direction, i.e. a direction with which the movable unit may be moved by the linear motor or drive, may be fixed.

Fixing the movable unit may be useful in three different situations in particular. First, a complete mechanical fixation of the movable unit may lead to the fact that a product placed on the movable unit may be processed and no displacement of the movable unit is possible during processing. This is e.g. advantageous when a method for processing the product is to be used which causes a force to be applied to the product, for example in a milling or drilling operation. Furthermore, with the aid of the fixing device, a braking of the movable unit may be achieved, so as to prevent the movable unit from running into an obstacle. This may e.g. be achieved by an embodying the fixing device as a brake, wherein a controller outputs signals with the aid of which the fixing device is controlled. It may additionally be provided that the fixing device serves to suppress movement of the movable unit, e.g. in the event of a power failure and thus a failure of the power supply. This allows for suppressing uncontrolled further movement of the movable units.

According to a second aspect, a movable unit of the linear transport system, wherein a rotor is arranged on the movable unit and comprises one or a plurality of magnets. The movable unit comprises a fixing device set up to fix the movable unit in the linear transport system. The fixing device comprises a movable element that may be moved between a first position and a second position. When the movable element is arranged in the first position, the movable element thereby triggers a mechanical fixation of the movable unit.

EXAMPLES

In an embodiment, the movable element may be held in the second position with the aid of an electromagnet. The electromagnet may be supplied with a current via the energy transmitting coil or the energy receiving coil, respectively. A reset element acts against a force generated by the electromagnet, wherein movement of the movable element to the first position may be carried out by the reset element.

This embodiment is particularly useful for the application as a safety element. In normal operation, the electromagnet is supplied with a current via the energy transmitting coil and the energy receiving coil, thereby moving the movable element to the second position. If the current now fails, the magnetic field of the electromagnet collapses and the reset element moves the movable element to the first position, resulting in a fixation of the movable unit. In particular, such a safety element may also be embodied without a controller, i.e. passively, since the components described mean that a failure of the power supplied to the electromagnet leads to a fixation directly and without intervention of a controller. In this way, possible damage caused by a power failure to the system may be avoided.

In an embodiment, the stationary unit comprises a stationary antenna and the movable unit comprises a movable antenna. The movable unit comprises a controller, wherein the controller is arranged to control the fixing device based on a signal transmitted from the stationary antenna to the movable antenna.

This allows the fixing device to be controlled so that fixations may be created and released again during normal operation. This may e.g. be used to slow down a movement of the movable unit or to fix the movable unit for a further method step in which a mechanical action is to be exerted on a product arranged on the movable unit.

The last two embodiments may also be combined in such a way that, on the one hand, a power failure leads to a switching off of the electromagnet and thus the fixation is triggered and, on the other hand, a current of the electromagnet may also be switched off with the aid of the controller and in this case the reset element also leads to a, in this case controlled, fixation of the movable unit.

In an embodiment, the linear transport system has a guide rail. The movable units may be moved along the guide rail by the drive. The movable unit comprises rollers that roll on running surfaces of the guide rail. The fixing device makes it difficult to move the movable unit along the guide rail. As a result, braking or even complete fixing of the movable unit may be achieved.

In an embodiment, the guide rail comprises bore holes, wherein the movable element may engage in the bore holes. In the first position, the movable element is at least partially arranged in one of the bore holes. In this way, complete fixation may particularly be achieved, since the engagement of the movable element in a bore hole of the guide rail may prevent further movement of the movable unit along the guide rail. As a result, the movable unit may be fixed on the guide rail.

In an embodiment, the movable element is set up to fix the movable unit to withstand movements triggered by the drive.

In an embodiment, the movable element has a first brake pad. The first brake pad contacts the guide rail when the movable element is arranged in the first position. It may be provided in this context that the first brake pad does not contact the guide rail when the movable element is arranged in the second position. This embodiment allows for braking of the movable unit during movement along the guide rail. Depending on the coefficient of friction between the first brake pad and the guide rail, in addition to braking, this may also serve to completely immobilize the movable unit if a frictional force imparted on the guide rail by the first brake pad is larger than a force by which the movable unit would be moved. Such a system may produce efficient braking of the movable unit. In this context, a plurality of first brake pads may be provided, as well.

In an embodiment, the movable element has a second brake pad. The second brake pad contacts one of the rollers when the movable element is arranged in the first position. In this embodiment, the movement of the rollers is suppressed by the second brake pad and thus a fixation of the movable unit is achieved, as well. In this case, a plurality of second brake pads may be provided, which may act on one or more rollers.

The described embodiments, i.e. the engagement of the movable element in bore holes of the guide rail, providing the movable element with a first brake pad that may be placed on the guide rail and providing the movable element with a second brake pad that may act on the rollers, may be combined in any combination. For example, a plurality of different fixing devices may also be arranged on the movable unit, and may be used in different situations. For example, in one of the two embodiments the brake pad may be used as a brake, while fixing with the aid of a bore hole and a movable element engaging in the bore hole may be used in the event of a power failure. If the embodiments with first brake pad and second brake pad are not combined, both the first brake pad and the second brake pad may be referred to as brake pad.

The features of the movable unit described for the linear transport system may each also be provided to solely improve the movable unit.

BRIEF DESCRIPTION OF THE DRAWINGS

The invention will be discussed in more detail below with the aid of embodiment examples and with reference to figures. Here, in a schematic illustration in each case

DETAILED DESCRIPTION

Figure 1:
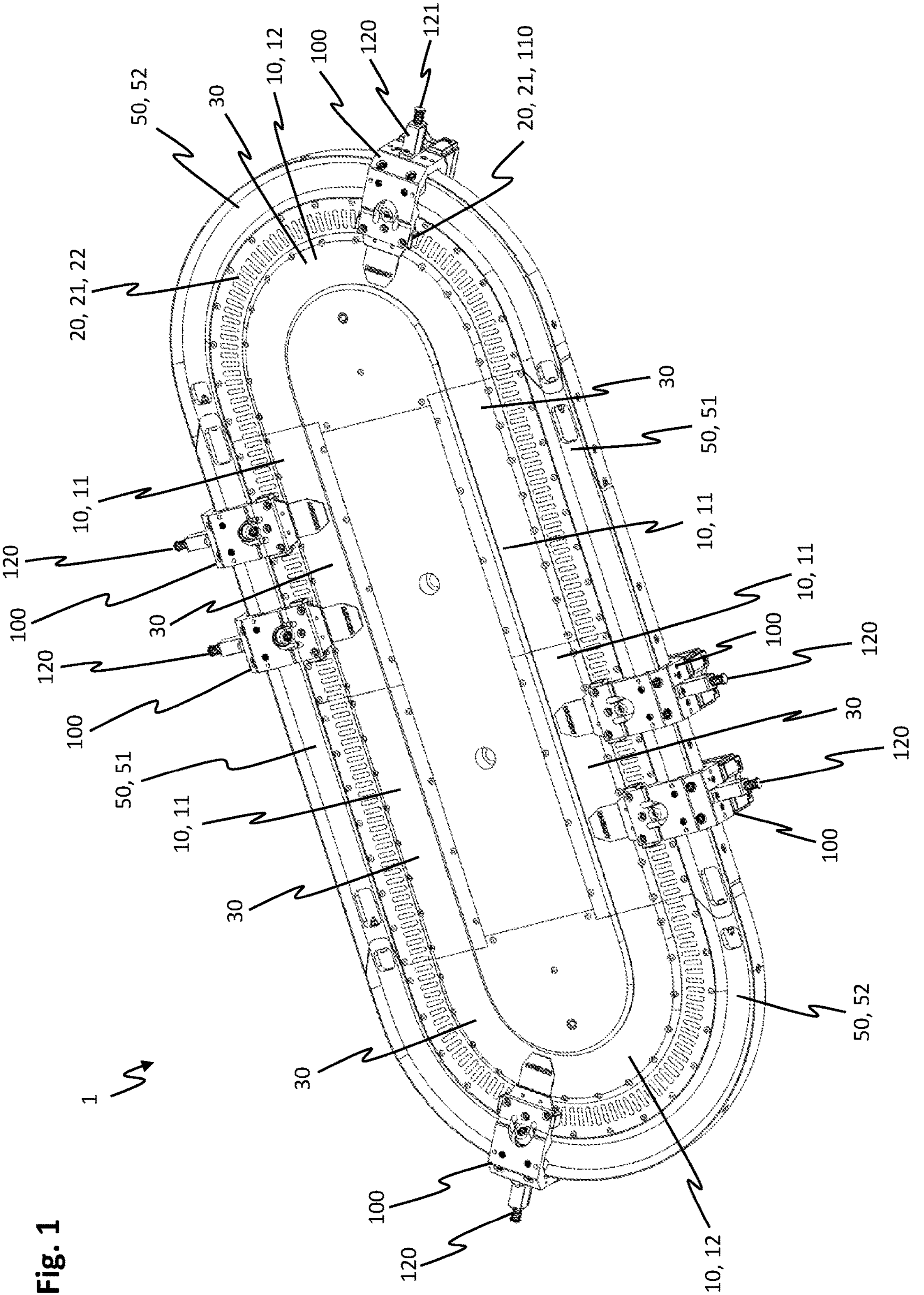
FIG. 1 shows a linear transport system.

FIG. 1 shows a linear transport system 1 comprising a plurality of stationary units 10 and a plurality of movable units 100. Embodiments with only one stationary unit 10 and/or one movable unit 100 are conceivable, as well. The stationary units 10 comprise straight stationary units 11 and curved stationary units 12, wherein the stationary units 10 are arranged in such a way that a closed path of movement results. This means that the movable units 100 may be moved along the stationary units 10 in a closed path curve. Furthermore, guide rails 50 are arranged at the stationary units 10, wherein the guide rails 50 comprise straight guide rails 51 and curved guide rails 52. The movable units 100 may be moved along the guide rails 50 along a closed path. To drive the movable units 100, the linear transport system 1 comprises a drive 20. The drive 20 comprises a linear motor 21 consisting of a stator 22 and a rotor 110. The stator 22 is in this context arranged at the stationary units 10, while the rotor 110 is arranged at the movable units 100. For clarity, the rotor 110 is depicted only in one of the movable units 100, but is also present on the other movable units 100. Via the drive 20, the movable units 100 may be moved along the guide rails 50.

The movable units 100 comprise a fixing device 120. The fixing device 120 comprises a movable element 121. The movable element 121 may be moved between a first position and a second position, wherein the movable element triggers a mechanical fixation of the movable unit 100 in the first position. Energy sending coils 30 are arranged within the stationary units 10, and may be used to transfer energy from the stationary units 10 to the movable units 100.

Figure 2:
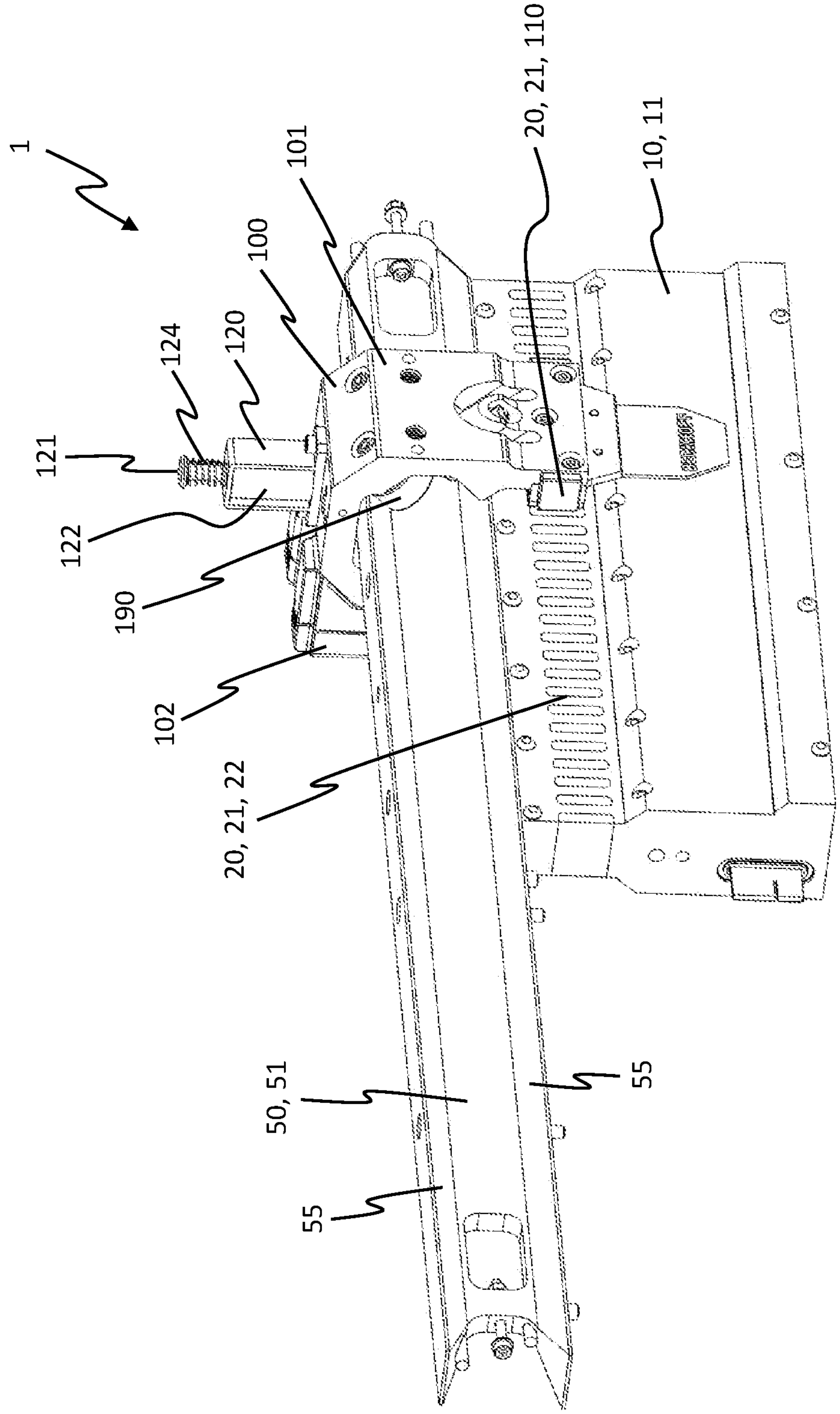
FIG. 2 shows a section of the linear transport system.

FIG. 2 shows a section of the linear transport system 1 of FIG. 1. One of the straight stationary units 11, one of the straight guide rails 51 and a movable unit 100 arranged at the guide rail 51 are shown. The movable unit 100 comprises a frame 101 on which guide rollers 190 are arranged. The guide rollers 190 may roll on running surfaces 55 of the guide rail 50. Thus, the movable unit 100 may be moved along the guide rail 50 while being driven with the aid of the drive 20. The movable unit 100 further comprises a switch-on unit 102, wherein the switch-on unit 102 may comprise an energy receiving coil. Thus, energy may be transmitted to the energy receiving coil of the switch-on unit 102 via the energy transmitting coil 30. The fixing device 120 comprises the movable unit 121 and an electromagnet 122. In this context, the movable unit 121 may be moved away from the guide rail 50 with the aid of the electromagnet 122. As a result, the movable unit 121 is arranged in the first position. A reset element 124, which is herein embodied as a spring, is used to move the movable element 121 back in the direction of the guide rail 50 when the electromagnet 122 is no longer supplied with electrical current and thus to move the movable element 121 into a second position in the direction of the guide rail 50.

Figure 3:
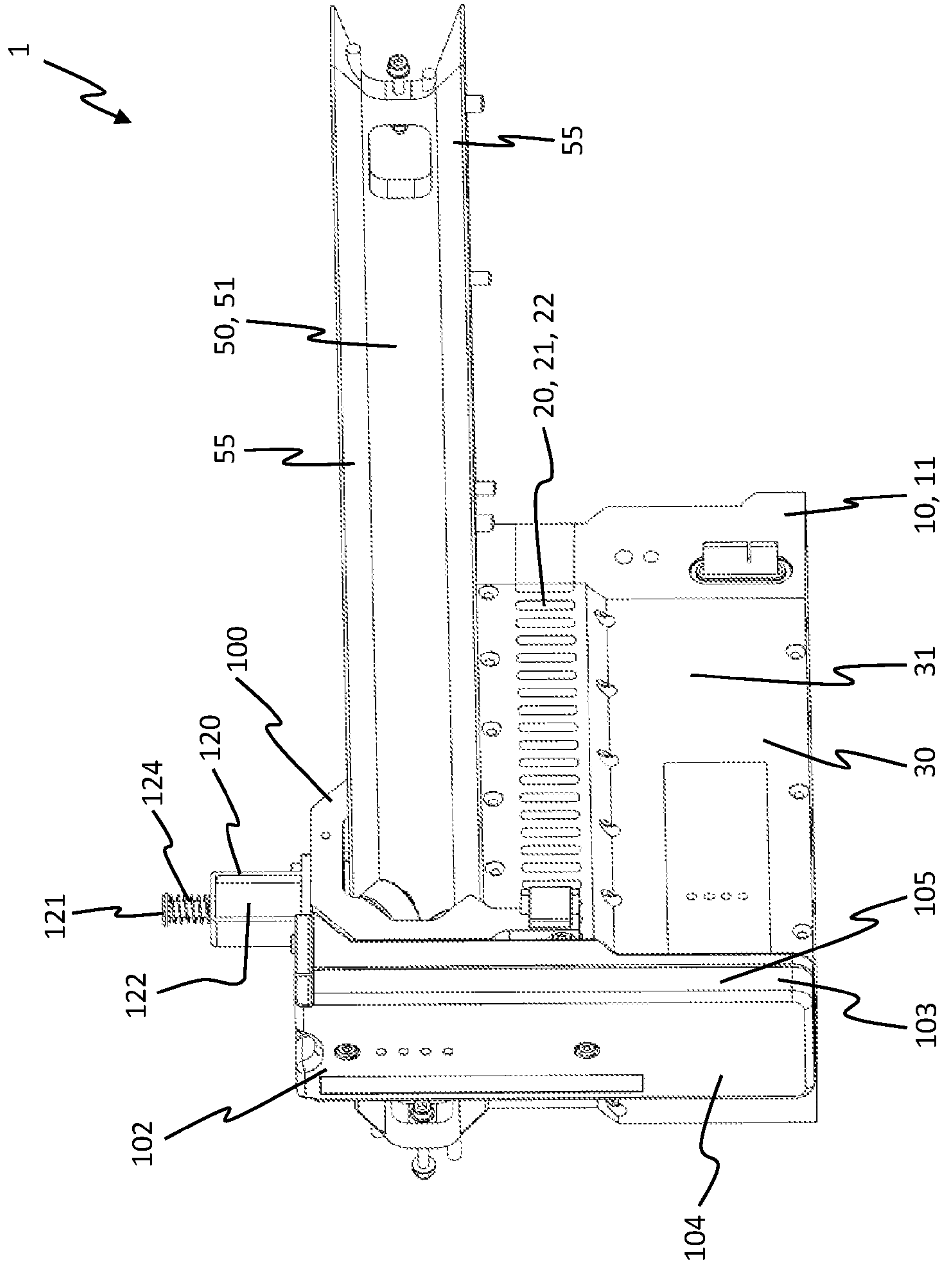
FIG. 3 shows a further section of the linear transport system.

FIG. 3 shows a rear view of the section of the linear transport system 1 of FIG. 2. Within the switch-on unit 102, the energy receiving coil 103 is arranged such that it faces the energy transmitting coil 30 of the stationary unit 10. Furthermore, an optional controller 104 is arranged within the switch-on unit 102. The controller 104 may be used to move the movable element 121 in a controlled manner with the aid of the electromagnet 122.

Instead of the electromagnet 122, another device with the aid of which the movable element 121 may be moved may also be used, e.g. the movable element may be moved with the aid of a servo motor or with the aid of a stepper motor. In this case, a gearbox may also be provided.

The stationary unit 10 comprises an optional stationary antenna 31. The switch-on unit 102 of the movable unit 100 comprises an optional movable antenna 105, wherein the movable antenna 105 has a fixed position relative to the movable unit 100 and is moved along with the movable unit 100. The stationary antenna 31 and the movable antenna 105, respectively, may be used to transmit data from the stationary unit 10 to the movable unit 100 and vice versa, and the controller 104 may then control the electromagnet 122 and thus the movable element 121.

The energy receiving coil 103, the controller 104 and the movable antenna 105 are shown as part of the switch-on unit 102, but may also be arranged on the movable unit 100 without being part of a switch-on unit 102. This also applies to the following embodiments.

Figure 4:
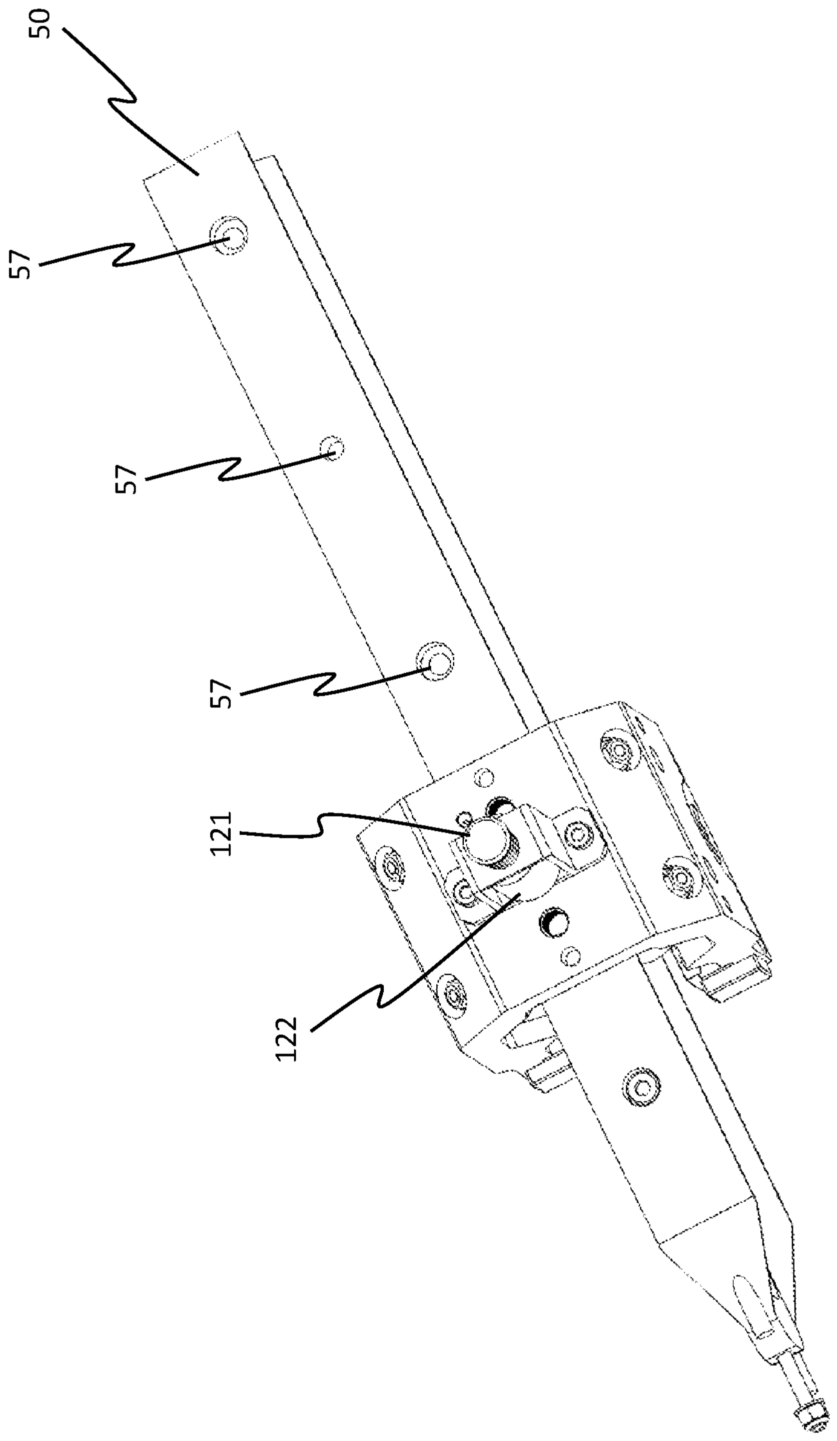
FIG. 4 shows a guide rail with bore holes.

FIG. 4 shows a top view of the guide rail 50 of the section of the linear transport system of FIGS. 2 and 3. The guide rail has bore holes 57, and the movable element 121 may engage in the bore holes 57. In the first position, the movable element 121 is at least partially arranged in one of the bore holes 57.

Figure 5:
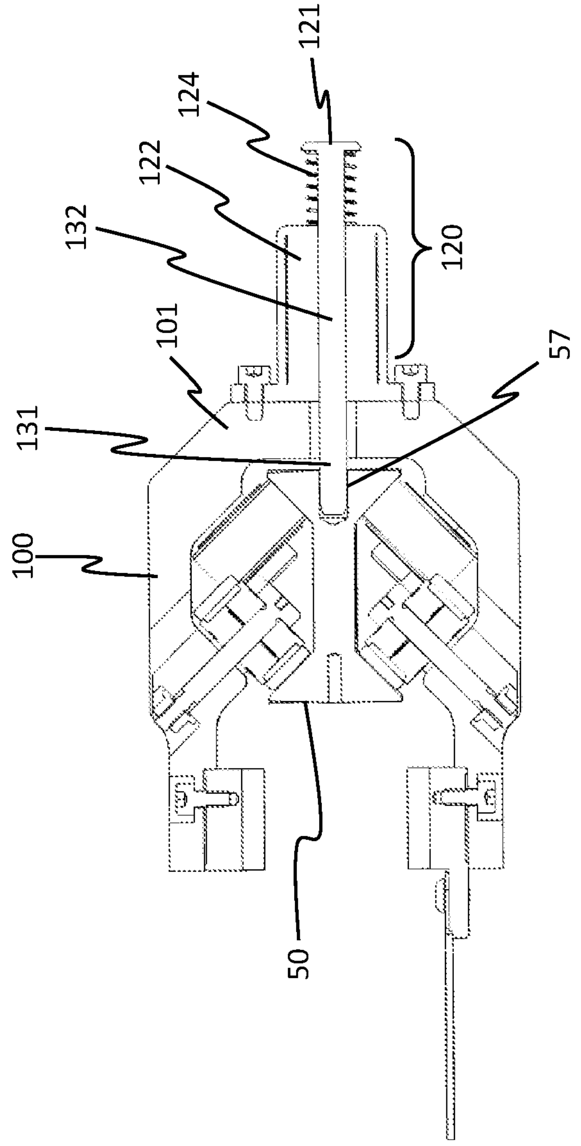
FIG. 5 shows a cross-section through a guide rail and a movable unit.

FIG. 5 shows a cross-section through the movable unit 100 and the guide rail 50, while the movable unit 121 is arranged at least partially in the bore hole 57. In this case, the movable unit 121 projects over the frame 101 of the movable unit 100 in such a way that the movable element 121 is arranged in the bore hole 57. Thereby, the movable unit 121 is arranged in a first position 131. The fixing device 120 again comprises the electromagnet 122 and the reset element 124 in the form of a spring. In the first position 131, the reset element 124 is without tension. If current is now transmitted to the movable unit 100 via the energy transmitting coil 30 and the energy receiving coil 103, the electromagnet 122 may be energized, thereby generating a magnetic field and thereby moving the movable element 121 out of the bore hole 57. This movement occurs against a resetting force of the reset element 124. Thus, in the embodiment shown, the reset element 124 is stretched and, once the electromagnet 122 ceases to apply further force, may move the movable element 121 back to the first position 131.

Figure 6:
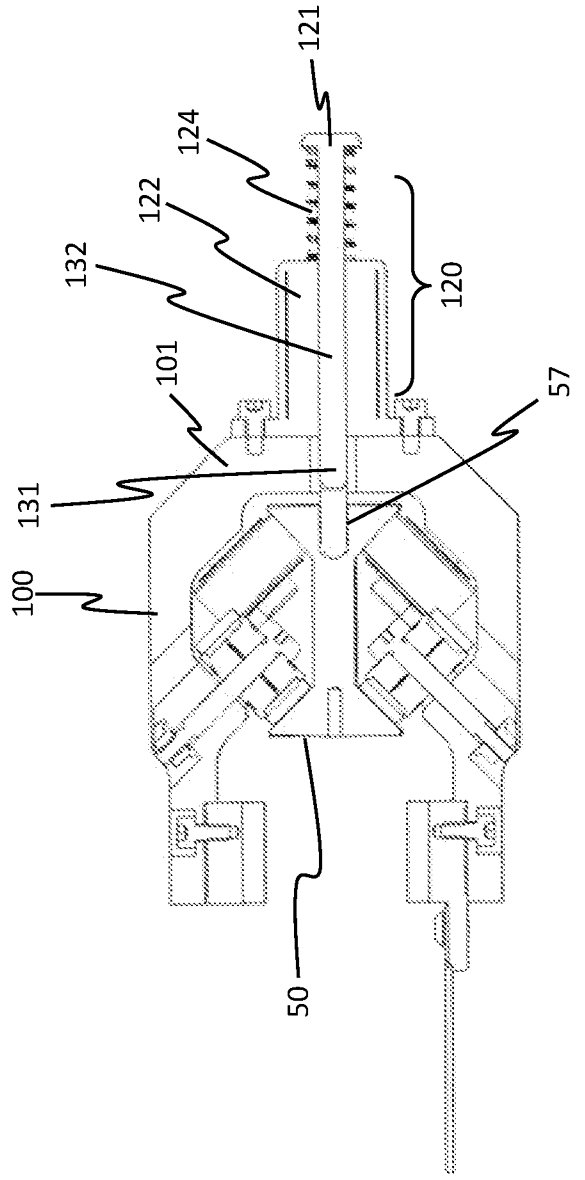
FIG. 6 shows a further cross-section through a guide rail and a movable unit.

FIG. 6 shows the cross-section of FIG. 5 after the electromagnet 122 has been activated and the movable element 121 has been moved out of the bore hole 57. In this second position 132 of the movable element 121, the movable unit 100 may be moved along the guide rail 50. If the power supply fails, for example, the movable element 121 is moved back towards the first position 131 due to the reset element 124 and engages in one of the bore holes 57, so that the movable unit 100 is now fixed. In this case, the deactivation of the electromagnet may be carried out, on the one hand, by a power failure and, on the other hand, also by a signal from a controller 104 actuated in the switch-on unit 102. In a further movement of the movable unit 100, the movable element 121 engages in the next bore hole 57 which is reached at the latest.

In the fixing device 120 shown in FIGS. 1 to 6, the movable element 121 is moved perpendicular with regard to the guide rail 50 towards the guide rail 50. The aim is that the movable element 121 may engage in the bore holes 57 and thereby achieve a fixation of the movable unit 100 withstanding further movement along the guide rail 50. On the one hand, this may be done in the context of the described emergency brake, so that after a power failure the movable units 100 are prevented from further movement by a movement of the movable elements 121 into the bore holes 57. Furthermore, this may also be used to hold the movable units 100 in place while a product placed on the movable unit 100 is being processed in a processing station.

Figure 7:
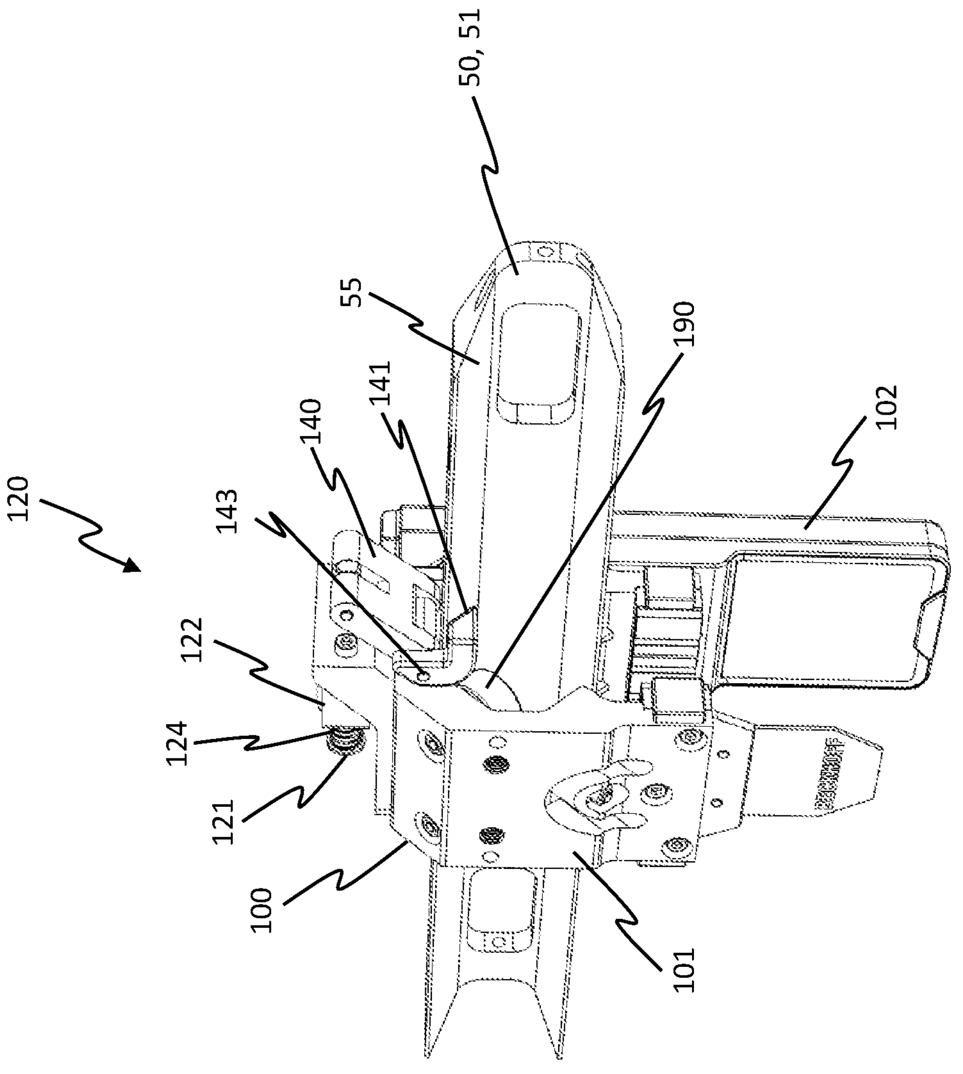
FIG. 7 shows a further section of a linear transport system.

FIG. 7 shows a movable unit 100 at a guide rail 50, in which the fixing device 120 has a different design. In this embodiment, the movable unit 121 may be moved in parallel to the guide rail 50 with the aid of the electromagnet 122, rather than perpendicular to the guide rail 50. A first brake pad 141 may be moved against a running surface 55 of the guide rail 50 via a movement converter 140 connected to the movable unit 121. In this context, the movement converter 140 may be rotated about an axis 143, the axis 143 being fixed relative to the frame 101 of the movable unit 100. When the movable element 121 is moved, this movement is converted via the movement converter 140 and the first brake pad 141 is pressed against the running surface 55 of the guide rail 50. This is the case in the first position. In a second position of the movable element 121, the first brake pad 141 is moved away from the guide rail 50 or the running surface 55 with the aid of the movement converter 140. This fixing device 120 of FIG. 7 may e.g. be used as a brake if a controller 104 is arranged within the switch-on unit 102 for controlling the electromagnet 122 of the fixing unit 120. However, it may also be provided to use the fixing device 120 of FIG. 7 as an emergency brake if no controller is provided in the switch-on unit 102 and, in the event of a power failure, the first brake pad 141 is moved in the direction of the guide rail 50 and thus results in slowing down of the movable unit 100.

Figure 8:
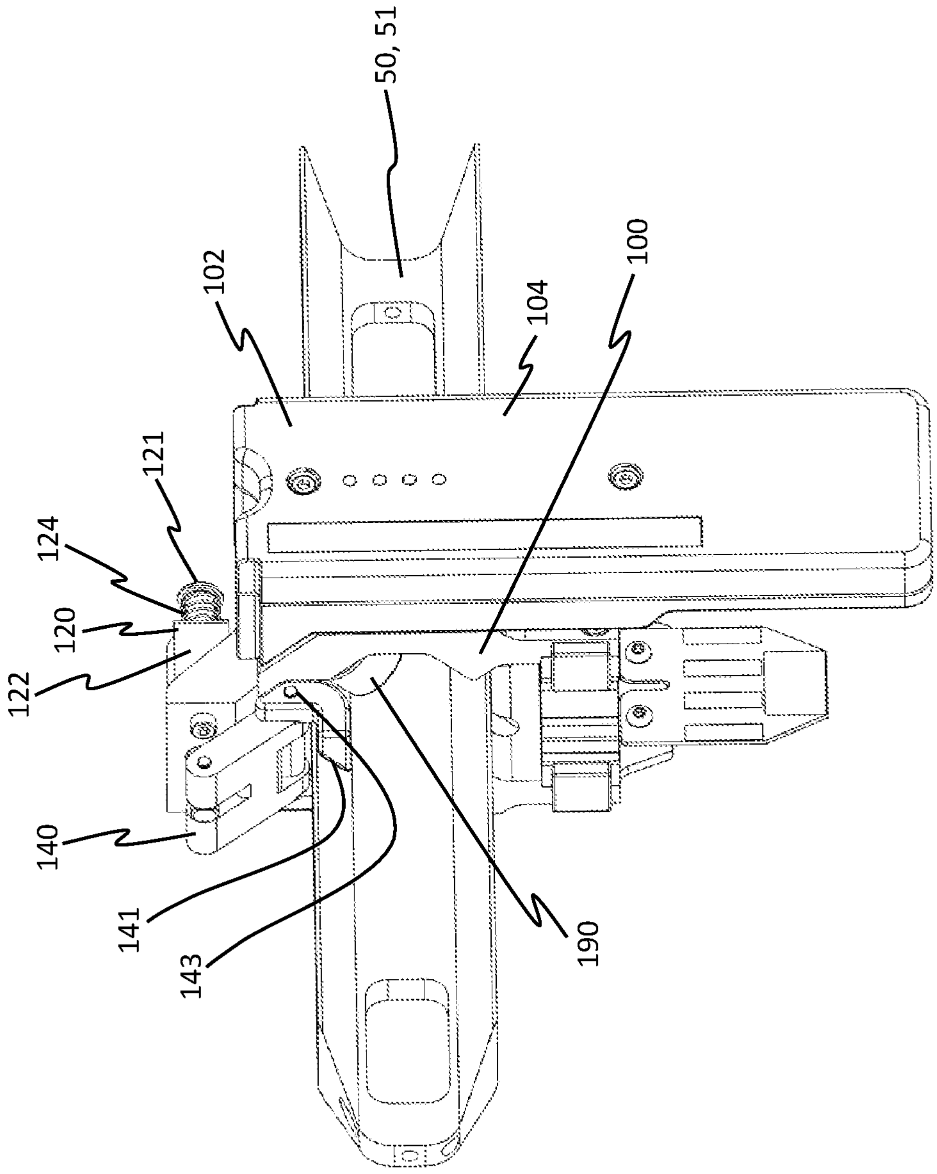
FIG. 8 shows a movable unit having a first brake pad.

FIG. 8 shows a rear view of the movable unit 100 of FIG. 7. The switch-on unit 102 may be connected to the electromagnet 122, thereby providing current to the electromagnet 122. On the one hand, this may be a permanent provision of a current for the electromagnet 122 so that the reset element 124 only moves the movable unit 121 when the current fails and thus a movement of the first brake pad 141 in the direction of the guide rail 50 is triggered. However, the switch-on unit 102 may also comprise an optional controller 104 that may be used to provide a power supply to the electromagnet 122.

The fixing device 120 comprises two first brake pads 141, one on each side of the guide rail 50. A different number of first brake pads 141 may also be provided, in particular only one first brake pad 141.

Figure 9:
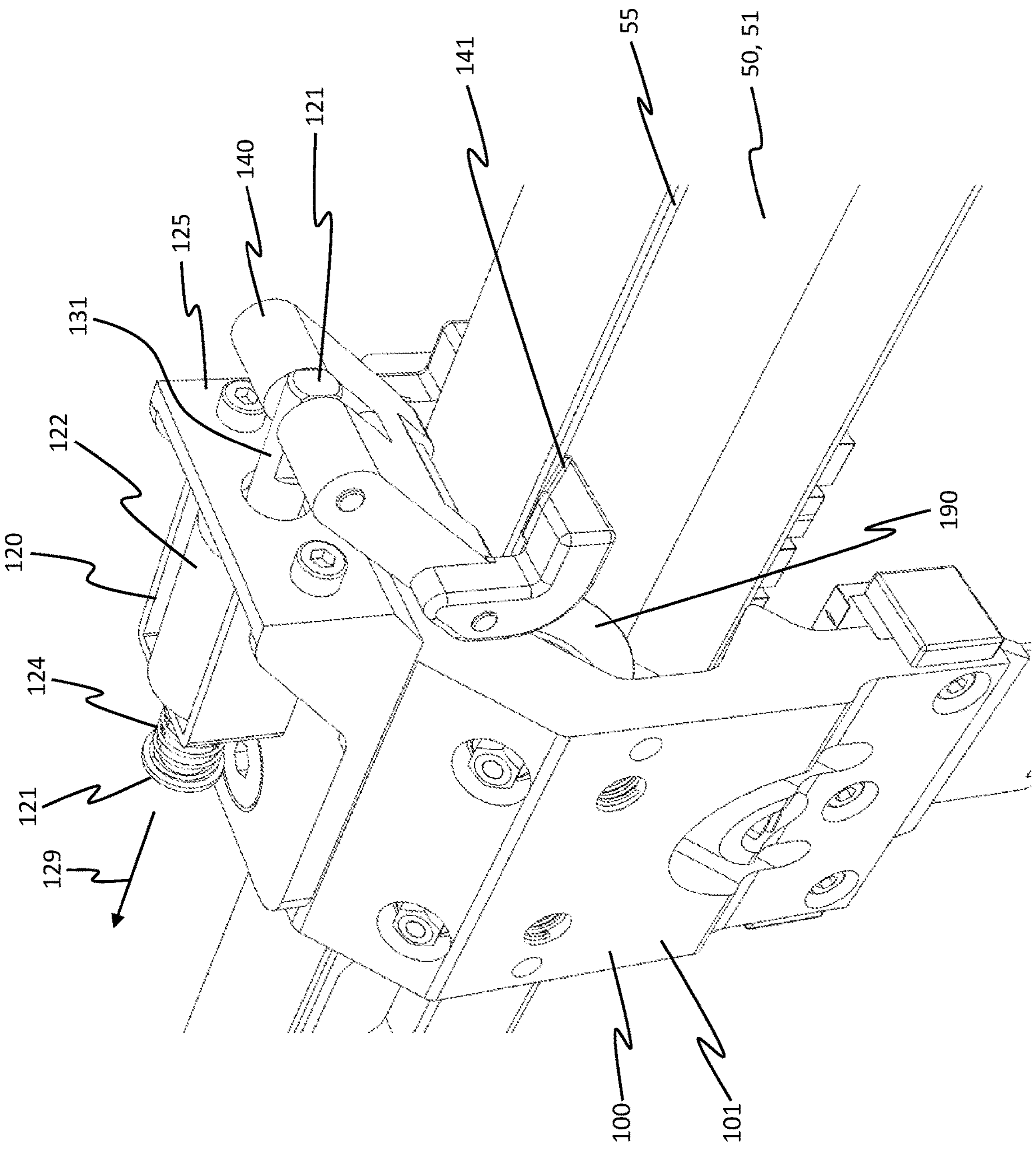
FIG. 9 shows an enlarged view of a movable unit having a first brake pad.

FIG. 9 shows an enlarged view of the braking device 120 of FIGS. 7 and 8. The movable element 121 is arranged in a frame element 125 with the aid of the electromagnet 122 and the reset device 124. When the movable element 121 moves in a direction 129, the movement converter 140 is moved in such a way that the first brake pad 141 is pressed against the running surface 55 of the guide rail 50, thereby fixing the movable unit 100. By moving the movable element 121 in the direction 129, the movable element 121 is brought to a first position 131, wherein the first brake pad 141 then contacts the running surface 55 of the guide rail 50.

Figure 10:
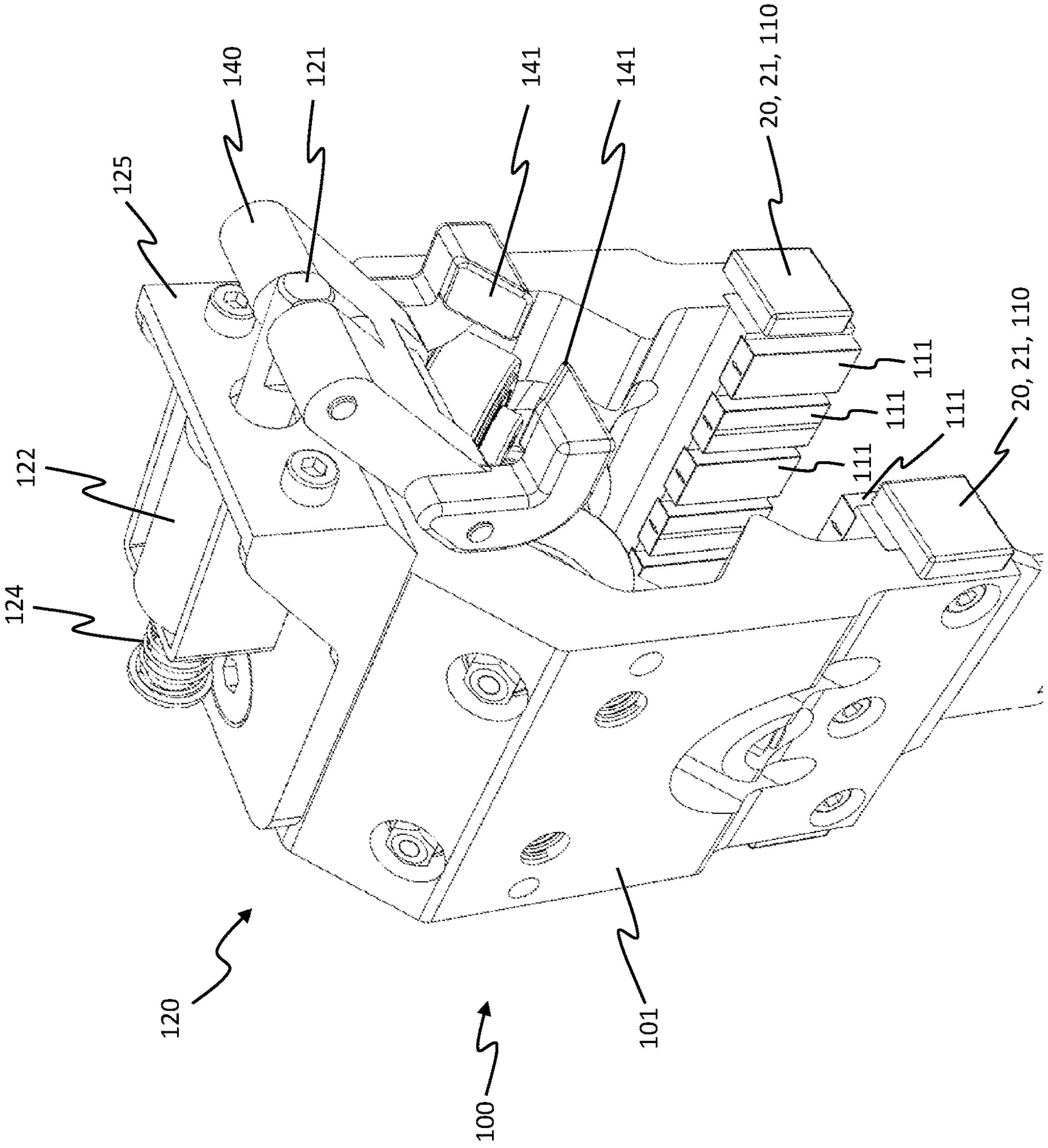
FIG. 10 shows a movable unit having a first brake pad without the guide rail being shown.

FIG. 10 shows a further enlarged view of the fixing device 120 of FIGS. 7 to 9. However, in FIG. 10, the magnets 111 of the rotor 110 of the linear motor 20 are visible. The magnets 111 are also arranged on the rotor 110. Furthermore, it is made clear by this depiction that the fixing device 120 comprises two first brake pads 141.

Figure 11:
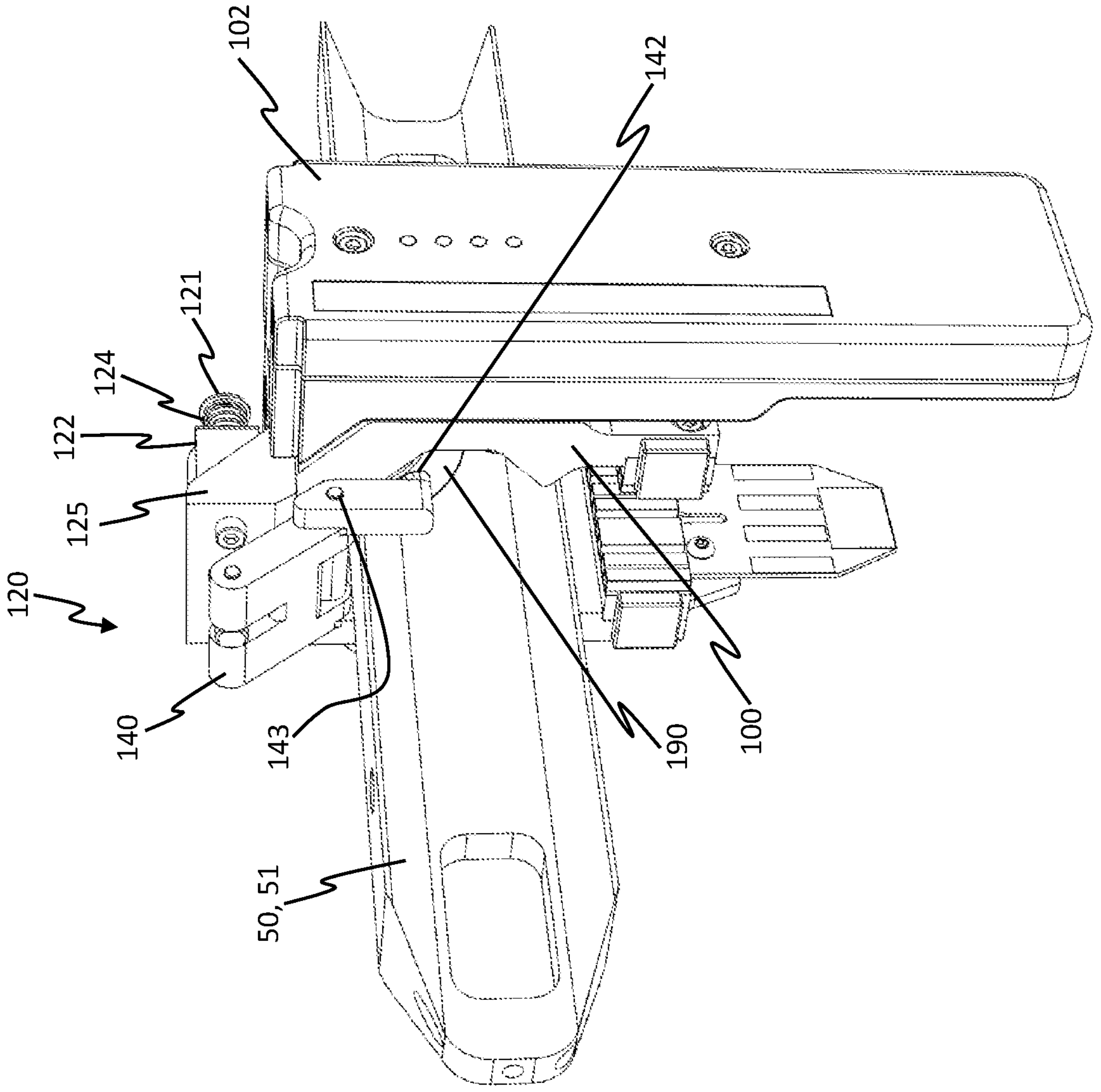
FIG. 11 shows a movable unit having a second brake pad.

FIG. 11 shows a further embodiment of a movable unit 100 comprising a fixing device 120. In this embodiment, the movement converter 140 is configured in such a way that a movement of the movable element 121 generates a movement of a second brake pad 142 in the direction of one of the guide rollers 190. When a force is applied in the direction 129 by the electromagnet 122, the movement converter 140 is moved in such a way by the movable element 121 such that the second brake pad 142 is pressed against the guide roller 190. This also allows for braking the movement of the movable unit 100 within the framework of a brake. The movable element 121 is moved to the first position 131 for this purpose. In an alternative embodiment, it may also be provided that the electromagnet 122 removes the second brake pad 142 from the roller 190 and, in the event of a power failure, presses it back against the roller 190 with the aid of the reset element 124.

Figure 12:
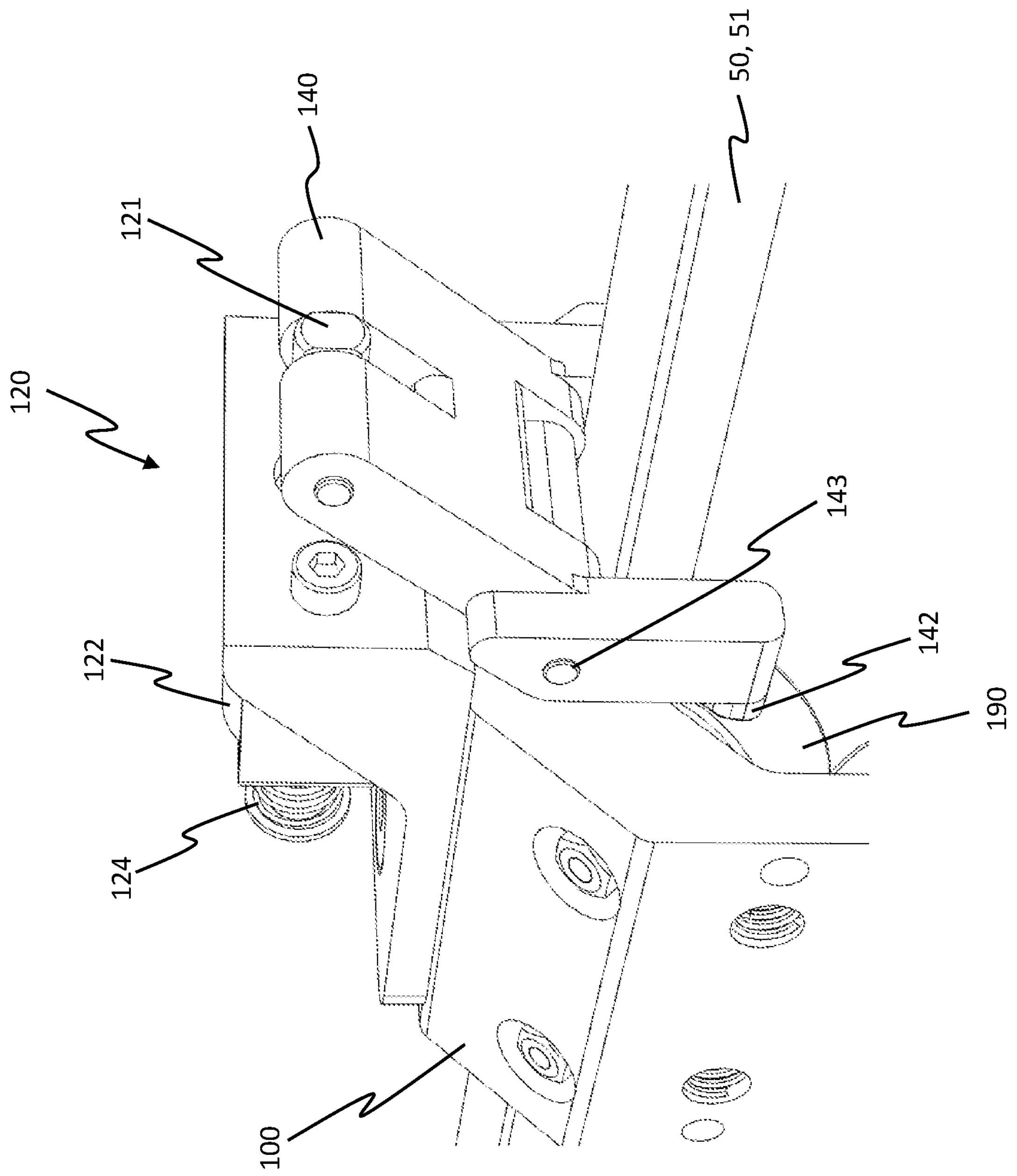
FIG. 12 shows an enlarged view of the movable unit having a second brake pad.

FIG. 12 shows an enlarged view of the fixing device 120 of FIG. 11. A movement of the movable element 121 moves the movement converter and presses the second brake pad 142 against the roller 190. In this case, the movement converter 140 is rotatably mounted about an axis 143, wherein a movement of the movable unit 121 may be correspondingly converted into a movement of the second brake pad 142.

Figure 13:
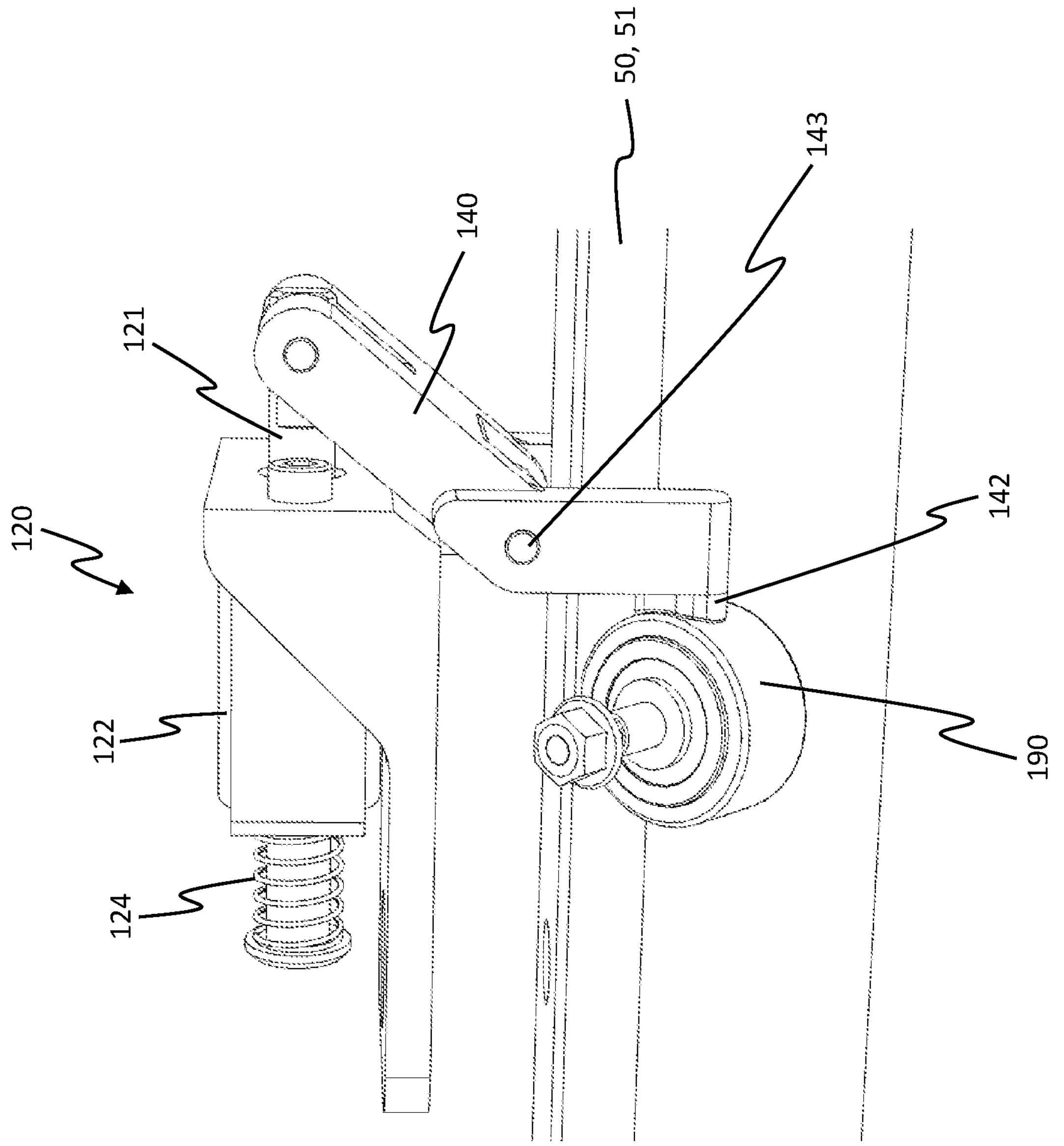
FIG. 13 shows a schematic depiction of a fixing device having a second brake pad.

FIG. 13 shows a further view of the fixing device 120 of FIGS. 11 and 12, in which the effect of the second brake pad 142 on the roller 190 may be seen in more detail. In this case, the movable element 121 is arranged in the first position. When the movable element 121 is moved to the left, the movement converter 140 is able to rotate about the axis 143, thereby removing the second brake pad 142 from the roller 190, so that free movement of the movable unit 100 along the guide rail 50 is now possible.

The embodiments shown may be combined with one another. For example, a fixing device 120 as shown in FIGS. 7 to 10 may be combined with a fixing device 120 as shown in FIGS. 1 to 6. In this case, the fixing device 120 shown in FIGS. 7 to 10 may be used as a brake, while the fixing device 120 shown in FIGS. 1 to 6 may be used to fix the movable unit 100 during product processing and in the event of a power failure. If only one fixing device 120 is used as shown in FIGS. 7 to 10, or only one fixing device 120 is used as shown in FIGS. 11 to 13, the first brake pad 141 and the second brake pad 142, respectively, may also be referred to as a brake pad.

The system shown may be used to provide a fixing device 120 for a linear transport system 1, with the aid of which, on the one hand, fixations of the movable unit 100 controlled via the switch-on unit 102 and the controller 104 are possible and, on the other hand, an appropriate fixing may also be provided in the event of a power failure.

TABLE 1

| List of reference numerals | |
|---|---|
| 1 | linear transport system |
| 10 | stationary unit |
| 11 | straight stationary unit |
| 12 | curved stationary unit |
| 20 | drive |
| 21 | linear motor |
| 22 | stator |
| 30 | energy transmitting coil |
| 31 | stationary antenna |
| 50 | guide rail |
| 51 | straight guide trail |
| 52 | curved guide rail |
| 55 | running surface |
| 57 | bore hole |
| 100 | movable unit |
| 101 | frame |
| 102 | switch-on unit |
| 103 | energy receiving coil |
| 104 | controller |
| 105 | movable antenna |
| 110 | rotor |
| 111 | magnet |
| 120 | fixing device |
| 121 | movable element |
| 122 | electromagnet |
| 124 | reset element |
| 125 | frame element |
| 129 | direction |
| 131 | first position |
| 132 | second position |
| 140 | movement converter |
| 141 | first brake pad |
| 142 | second brake pad |
| 143 | axis |
| 190 | roller |

The invention claimed is:

1. A linear transport system, wherein the linear transport system comprises:

at least a stationary unit and at least a movable unit, wherein the linear transport system further comprises a drive for driving said movable unit, wherein the drive comprises a linear motor, and wherein the linear motor comprises a stator and a rotor, wherein the stator comprises one or a plurality of instances of said stationary unit, and wherein the rotor is arranged on said movable unit and comprises one or a plurality of magnets;

wherein said stationary unit comprises an energy transmitting coil, wherein said movable unit comprises an energy receiving coil, wherein the energy receiving coil is configured to receive energy from the energy transmitting coil, wherein said movable unit comprises a fixing device, wherein the fixing device is arranged to fix said movable unit in the linear transport system, and wherein the fixing device comprises a movable element, wherein the movable element is movable between a first position and a second position;

wherein the movable element is configured to trigger a mechanical fixing of the movable unit in the first position, wherein the movable element is configured to be held in a second position with the aid of an electromagnet, wherein the electromagnet is configured to be supplied with a current with the aid of the energy transmitting coil and energy receiving coil, wherein a reset element acts against a force generated by the electromagnet, and wherein the movable element is configured for movement into the first position upon loss of the current supplied to the electromagnet.

2. The linear transport system according to claim 1, wherein;

the linear transport system comprises a guide rail, wherein the movable unit is movable along the guide rail by the drive, wherein the movable unit comprises rollers, wherein the rollers roll on running surfaces of the guide rail, and wherein movement of the movable unit along the guide rail is impeded by the fixing device.

3. The linear transport system according to claim 2, wherein said guide rail comprises bore holes for engaging the movable element, wherein the movable element is at least partially arranged in one of the bore holes in the first position.

4. The linear transport system according to claim 3, wherein the movable element is configured to fix the movable unit to withstand movements triggered by the drive.

5. The linear transport system according to claim 2, wherein the movable element comprises a first brake pad, wherein the first brake pad contacts the guide rail when the movable element is arranged in the first position.

6. The linear transport system according to claim 2, wherein the movable element comprises a second brake pad, wherein the second brake pad contacts one of the rollers when the movable element is arranged in the first position.

7. The linear transport system according to claim 1, wherein the stationary unit comprises a stationary antenna and the movable unit comprises a movable antenna, wherein the movable unit comprises a controller, wherein the controller is configured to control the fixing device based on a signal transmitted from the stationary antenna to the movable antenna.

8. A linear transport system, comprising:

at least a stationary unit and at least a movable unit, a drive for driving said movable unit along a guide rail of the linear transport system, wherein the drive comprises a linear motor, and wherein the linear motor comprises a stator and a rotor, and wherein the stator comprises one or a plurality of instances of said stationary unit;

wherein the rotor is arranged on said movable unit and comprises one or a plurality of magnets, wherein the guide rail comprises a top surface and two lateral running surfaces arranged on opposite sides of the guide rail, wherein the movable unit comprises a frame engaging the guide rail from a top surface and two lateral running surfaces, and wherein rollers are arranged at the frame, the rollers rolling on the two lateral running surfaces of the guide rail;

wherein the movable unit comprises a fixing device, wherein the fixing device is configured to fix the movable unit in the linear transport system, wherein the fixing device comprises a movable element, wherein the movable element is movable between a first position and a second position, wherein the movable element triggers a mechanical fixing of the movable unit in the first position, wherein the movable element is configured to be held in a second position with the aid of an electromagnet, wherein a reset element acts against a force generated by the electromagnet, wherein the movable element is configured for movement into the first position to be effected by the reset element, and wherein the fixing device comprises a movement converter and a brake pad, wherein the brake pad is configured for movement against or away from one of the lateral running surface of the guide rail or one of the rollers via the movement converter, the movement converter being connected between the movable element and the brake pad.

9. The linear transport system according to claim 8, wherein:

the stationary unit comprises an energy transmitting coil, and the movable unit comprises an energy receiving coil;

wherein the energy receiving coil is equipped to receive energy from the energy transmitting coil, wherein the electromagnet is configured to be supplied with a current with the aid of the energy transmitting coil and energy receiving coil, respectively, and wherein the movable element is configured for movement into the first position to be effected by the reset element upon loss of current supplied to the electromagnet.

10. The linear transport system according to claim 8, wherein:

the movable unit comprises a movable antenna, and the movable unit comprises a controller;

wherein the controller is configured to control the fixing device based on a signal received from the movable antenna.

11. The linear transport system according to claim 8, wherein:

the stationary unit comprises an energy transmitting coil, and the movable unit comprises an energy receiving coil;

wherein the energy receiving coil is configured to receive energy from the energy transmitting coil, wherein the electromagnet is configured to be supplied with a current with the aid of the energy transmitting coil and energy receiving coil, and wherein the movable element is configured for movement into the first position to be effected by the reset element upon loss of current supplied to the electromagnet.

12. A linear transport system, comprising:

at least a stationary unit and at least a movable unit, wherein the linear transport system further comprises a drive for driving said movable unit along a guide rail of the linear transport system, wherein the drive comprises a linear motor, and wherein the linear motor comprises a stator and a rotor, wherein the stator comprises one or a plurality of instances of said stationary unit, and wherein the rotor is arranged on said movable unit and comprises one or a plurality of magnets;

wherein the guide rail comprises a top surface and two lateral running surfaces arranged on opposite sides of the guide rail, the top surface comprising bore holes, wherein the movable unit comprises a frame engaging the guide rail from a top surface and two lateral running surfaces, wherein rollers are arranged at the frame, the rollers rolling on the two lateral running surfaces of the guide rail, wherein the movable unit comprises a fixing device, wherein the fixing device is configured to fix the movable unit in the linear transport system, and wherein the fixing device comprises a movable element, wherein the movable element is movable between a first position and a second position;

wherein the movable element triggers a mechanical fixing of the movable unit in the first position, wherein the movable element is configured to be held in a second position with the aid of an electromagnet, wherein a reset element acts against a force generated by the electromagnet, wherein the movable element is configured for movement into the first position to be effected by the reset element, wherein the movable element is configured to at least partially engage one of the bore holes of the top surface of the guide rail in the first position, and wherein the movable element is configured to move out of the one bore hole of the top surface of the guide rail in the second position.

* * * * *